United States Patent [19]

Tanaka

[11] Patent Number: 4,634,182

[45] Date of Patent: Jan. 6, 1987

[54] SEATBACK RECLINER MECHANISM AND INERTIA OPERATED LOCK

[75] Inventor: Aki Tanaka, Northridge, Calif.

[73] Assignee: P.L. Porter Co., Woodland Hills, Calif.

[21] Appl. No.: 764,013

[22] Filed: Aug. 9, 1985

[51] Int. Cl.[4] ............................................. B60N 1/02
[52] U.S. Cl. .................................. 297/379; 297/216; 297/363
[58] Field of Search ........ 297/216, 378, 379, 366–369, 297/363

[56] References Cited

U.S. PATENT DOCUMENTS

| | | | |
|---|---|---|---|
| 3,848,923 | 11/1974 | Dehler | 297/379 X |
| 4,219,234 | 8/1980 | Bell | 297/379 X |
| 4,223,946 | 9/1980 | Kluetug | 297/379 X |
| 4,366,984 | 1/1983 | Kluetug et al. | 297/379 |
| 4,402,547 | 9/1983 | Weston et al. | 297/379 |

FOREIGN PATENT DOCUMENTS 1421912  1/1976  United Kingdom ................ 297/379

Primary Examiner—William E. Lyddane
Assistant Examiner—Mark W. Binder
Attorney, Agent, or Firm—Beehler, Pavitt, Siegemund, Jagger, Martella & Dawes

[57] ABSTRACT

A seatback recliner mechanism made up of a fixed frame attachable to a seat bottom and a plate pivoted to the fixed frame and attachable to a seat back. An inertia operated lock mechanism for locking together the pivoted plate and the fixed frame under simultaneous deceleration of both elements. The inertia operated lock mechanism consists of a pawl pivoted on the upper plate and a pendulum pivotably suspended by the upper plate such that the pendulum swings forward under deceleration of the mechanism to abut the pivoted pawl and lock the pawl to the lower fixed frame and thereby lock the seat back and seat bottom.

6 Claims, 7 Drawing Figures

SEATBACK RECLINER MECHANISM AND INERTIA OPERATED LOCK

BACKGROUND OF THE INVENTION

1. Field of the Invention

The present invention pertains generally to the field of adjustable vehicle seats and more particularly relates to improved mechanisms for adjusting the inclination of the backrest and to an inertia operated lock for a backrest which is normally freely forwardly tiltable.

2. State of the Prior Art

Many reclining mechanisms and a variety of inertia operated locks for vehicle seat backrests are known. Both kinds of devices are extensively used in the automotive field where at least the driver's seat usually has a backrest adjustable to different angles relative to the seat. In the case of two door vehicles having a rear passenger seat, the backrests of the front seats are often provided with hinged mechanisms which in a normal condition allow the backrest to be readily pushed forward and tilted out of the way so as to facilitate access to the back seat. These hinge mechanisms remain unlocked even while the front seat is normally occupied during operation of the vehicle. Such hinges conventionally include inertia operated devices for locking the backrest of the front seats to prevent them from being thrown in the event sudden braking or collision, and to prevent the backrest from falling forward whenever the vehicle is on a steep incline. A variety of mechanisms for accomplishing these objectives are known and in use.

Presently known recliner adjustment mechanisms typically include two members hinged together, a gear rack formed along an arcuate edge of one member and a toothed pawl element pivotably mounted to the other member and movable into engagement with the rack so as to interlock the two members at a selected position. While such mechanisms are generally effective and many variations of the same are known, they suffer from a significant shortcoming in that they require relatively complicated linkages between the pivotable pawl element which is mounted in the vicinity of the hinged joint, i.e. underneath the backrest and towards the rear of the seat, and a release handle which desirably is more accessibly located closer to the front of the seat so as to be within easier reach of the driver. A further shortcoming inherent in pivoting pawl elements is that the teeth on the pawl do not all mesh simultaneously with the teeth on the rack. Due to the pivotal mounting of the pawl, the teeth nearest the pivot point of the pawl mesh with the rack teeth slightly ahead of the pawl teeth distal from the pivot point. It has been found that it is therefore possible for a false engagement to occur between the pawl and the rack in which a single tooth of the pawl engages the rack in such a way as to prevent full meshing of the gear teeth but which upon subsequent application of weight or force to the backrest the pawl disengages from the rack allowing the backrest to fall back to its fully reclined position under the weight of the driver's body, suddenly depriving the driver of back support. Such sudden loss of support in a moving vehicle may be the cause of an accident and such a possibility is clearly undesirable.

Existing inertia locks for vehicle backrests also are deficient in that no mechanism known to this applicant achieves a positive locking action between the backrest and the fixed portion of the seat without allowing some forward tilting of the backrest before the locking action is completed. A further defect in certain existing inertial locking mechanisms is that the mechanism may lock if the backrest is pushed forward too quickly during entry or exit by a passenger. Further, many of the existing inertial locks are unnecessarily complex and simplification of the mechanism is needed.

SUMMARY OF THE INVENTION

The present invention overcomes these and other shortcomings of the prior art by providing a recliner mechanism for a vehicle seat which comprises a frame attachable to either the backrest or the fixed portion of the seat, and a plate pivoted to the frame and attachable to the other of the backrest or fixed portion of the seat. A first series of teeth are formed along a circularly arcuate edge of the plate. A pawl element provided with a second series of teeth is mounted to the frame for substantially linear movement between a backrest locking position wherein the pawl teeth are in meshing engagement with the plate teeth to thereby interlock the plate and the frame against pivotable movement, and a backrest release position wherein the pawl is disengaged from the plate to allow free pivotal movement between the frame and the plate. A spring normally biases the pawl element towards the locking position and can be moved to the release position against the spring bias by means of a release handle. The pawl teeth are disposed along a circularly arcuate edge of the plate while the pawl teeth are formed along a circularly concave edge of the pawl and the linear pawl movement is along a line generally radial to both circularly curved edges. This arrangement overcomes the shortcomings of the prior art in that the pawl element can be elongated to any desired length with the pawl teeth formed on one end and the release handle connected to and operating upon the opposite end of the pawl element, thus eliminating any linkages or other moving parts interconnecting the release handle and the pawl. Further, since the pawl movement is linear in a direction generally radial to the curved toothed edges, meshing engagement occurs simultaneously along the full length of the toothed edges thus assuring positive locking engagement of the pawl with the plate.

The present invention also includes an improved inertia operated lock for a forward tilting backrest in a vehicle seat which comprises a lower plate attachable to a fixed portion of the seat and an upper plate pivoted to the lower plate and attachable to the backrest. The mechanism includes a stop which limits rearward pivoting of the upper plate relative to the lower plate and which thus defines the normal or upright position of the backrest. A pawl is pivoted to the upper plate and normally rests within and engages a recess in the lower plate. A first cam edge is formed on the lower plate which urges the pawl out of engagement with the recess upon forward pivoting motion of the upper plate. A pendulum consisting of an inertial mass is pivotably suspended to the upper plate and is swingable by its forward inertia into engagement with the pawl to positively stop the pawl against disengagement from the lower plate, thereby to interlock the two plates against pivotal movement upon deceleration of both upper and lower plates as in the event of braking or collision of the vehicle in which the seat mechanism is mounted. A second cam edge, also formed on the lower plate, normally supports the pendulum mass in a biased position with the center of gravity of the inertial mass raised forwardly of what would be its normal rest position absent the support of the second cam edge and towards engagement with the pawl. The second cam edge is shaped such that in a normal unaccelerated condition the pendulum mass is allowed to move toward its rest position and is released away from engagement with the pawl upon forward pivotal motion of the upper plate, thereby normally allowing free forward pivoting of the upper plate in relation to the lower plate. Thus, the backrest can normally be pushed forward to allow easy entry or exit into the back seat of a two door vehicle. Because of the prebiased condition of the pendulum, a relatively short travel distance is required to move the pendulum into positive engagement with the pawl thus obtaining fast locking response without appreciable play in the backrest before locking engagement is achieved.

As a safety feature, the center of gravity of the pendulum mass is located such that it is brought into vertical alignment with the pendulum pivot as the entire inertial lock is tilted forward. If the entire mechanism, i.e. the upper and lower plates together, is tilted forwardly beyond a predetermined angle to a normal device position, the pendulum mass swings forwardly, and the center of gravity of the pendulum mass is shifted into closer vertical alignment with the pendulum pivot such that the pendulum no longer moves away from engagement with the pawl upon attempted forward pivoting of the upper plate, thereby locking the backrest against forward tilting. This feature is designed to prevent accidental forward dumping of the backrest during pronounced forward tilting of the vehicle as for example while traveling on a steep incline.

As a further safety feature, the pendulum is configured and arranged so as to stop the pawl against disengagement from the lower plate upon attempted forward pivoting of the upper plate while the pendulum remains in its biased position, that is, unless it moves away from engagement with the pawl upon its release by the second cam edge upon forward pivoting of the upper plate. This is a fail-safe operating feature which ensures locking of the backrest during vehicle deceleration even in the event that the pendulum becomes non-responsive to inertial force, e.g., if it becomes frozen in place against pivotal movement due to accumulation of dirt or any other cause.

The inertia lock for the backrest may be integrated with the recliner mechanism in automotive seats intended for two-door passenger vehicles and having a rear passenger seat. In such an integrated unit, the lower plate of the inertia lock is integral with or fastened to the upper plate of the recliner mechanism. In four-door vehicles the inertia lock becomes unnecessary for facilitating access to the rear passenger seat and the recliner mechanism is installed as a unit complete in itself.

Both the disclosed recliner mechanism and inertia operated lock offer improved operation over similar existing devices, yet are of great simplicity, using a minimum number of parts for increased economy of manufacture. These and other advantages of the present invention will be better understood by reference to the following detailed description taken in light of the accompanying drawings.

DETAILED DESCRIPTION OF THE PREFERRED EMBODIMENTS

Figure 1:
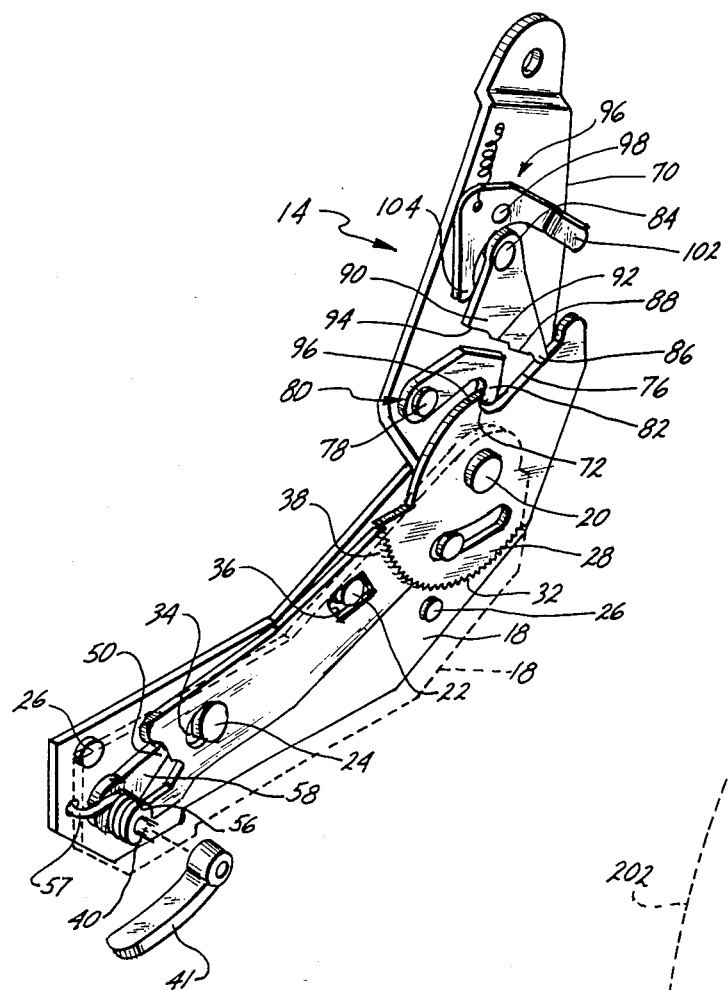
FIG. 1 is a perspective view of an integrated unit combining the recliner mechanism and inertia operated lock of this invention.
Figure 2:
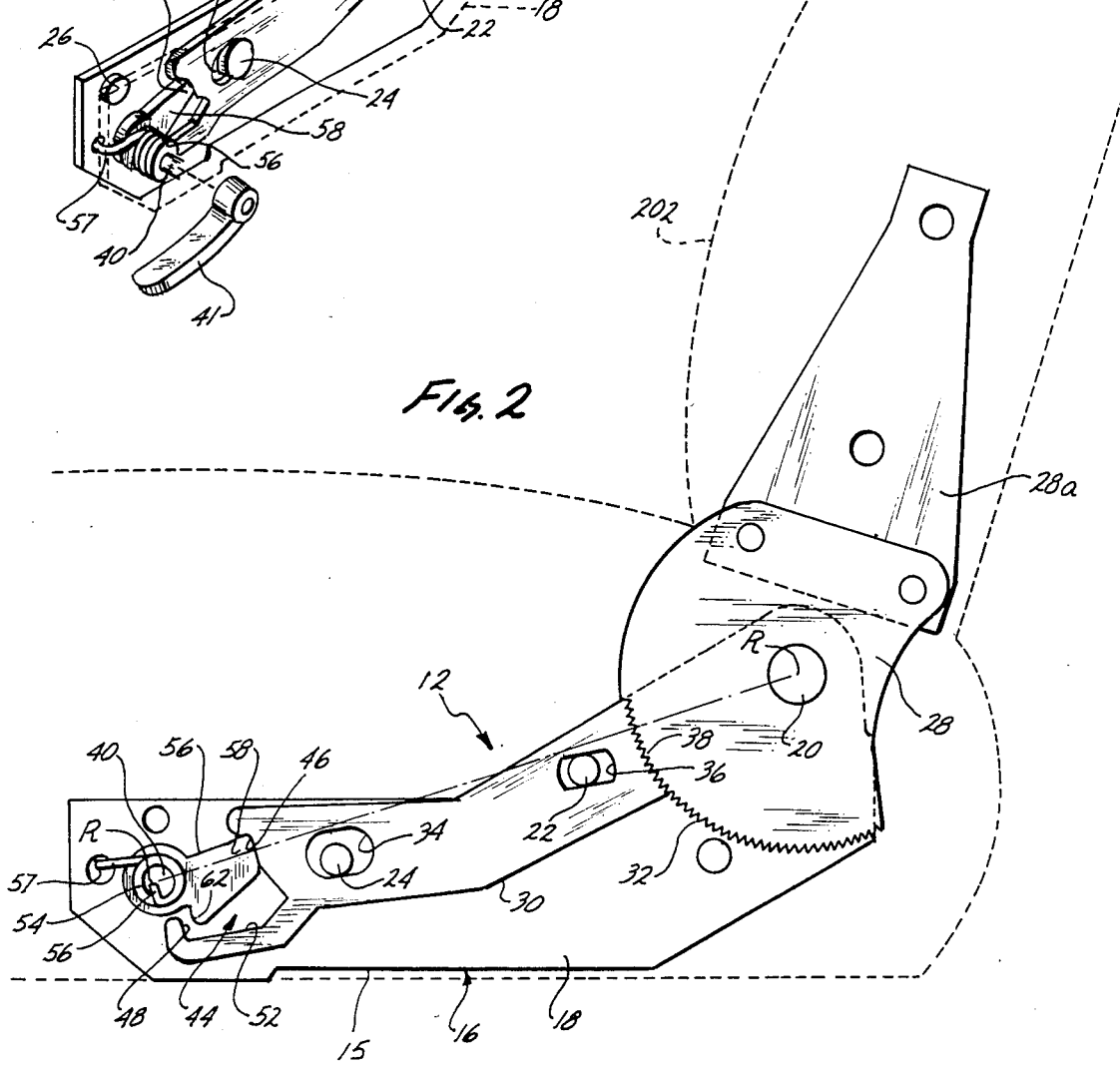
FIG. 2 is a side elevational view of a vehicle seat backrest recliner mechanism without the inertia operated lock, shown installed in a typical vehicle seat drawn in phantom lining, the recliner mechanism being in a normal locked position.
Figure 3:
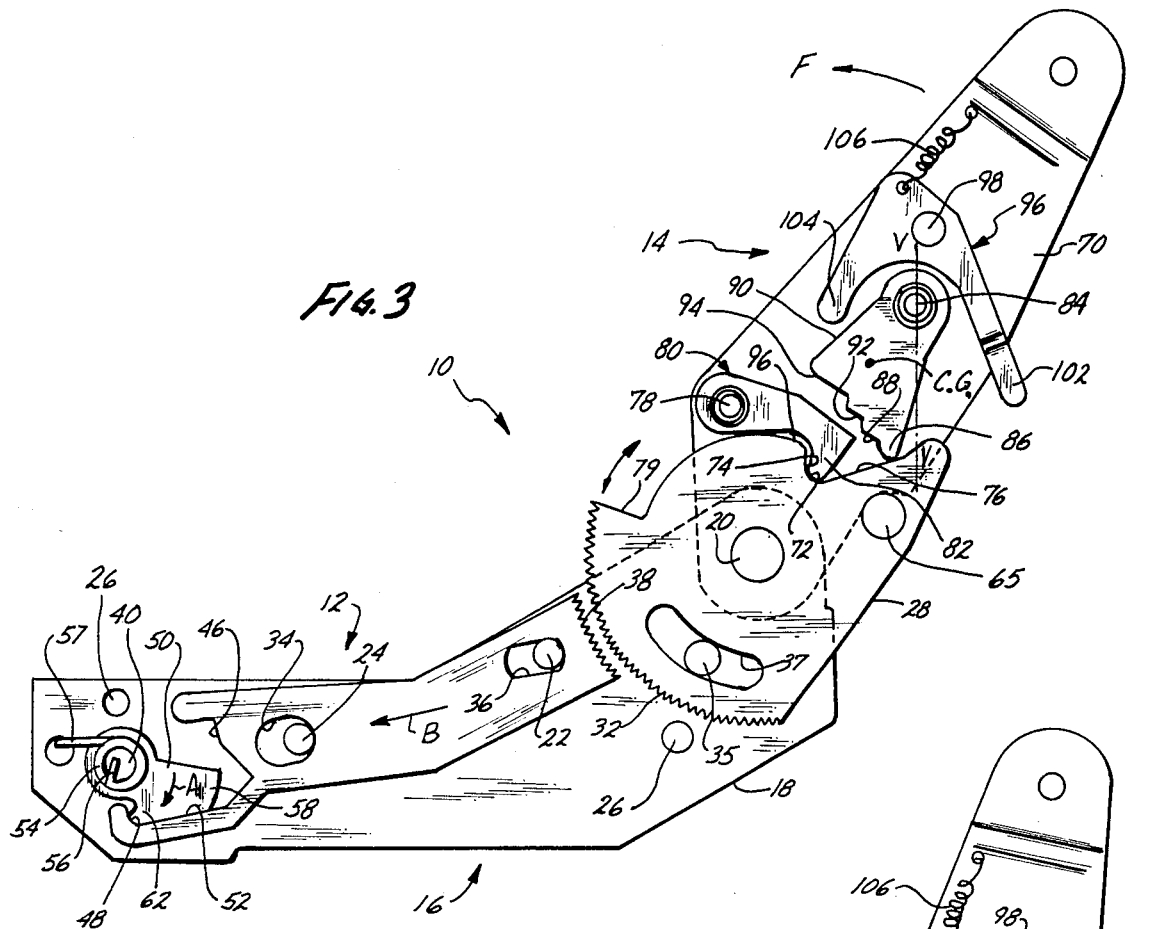
FIG. 3 illustrates in side elevational view an integrated unit combining the recliner mechanism and inertia operated lock of this invention, the recliner mechanism being shown in its released position to allow adjustment of the backrest inclination, the inertia operated lock being shown in a normal condition.

With reference to the drawings, FIG. 1 illustrates an integrated unit 10 which combines a backrest recliner mechanism 12 and an inertia locking mechanism 14. The recliner adjustment mechanism portion 12 of the unit 10 includes a frame 16 consisting of two mutually parallel plate members 18, one of the plate members being shown in phantom lining for clarity. The two members 18 are maintained in spaced apart relationship by a pivot pin 20, two guide pins 22, 24 and two spacers 26. A plate 28 is pivotably mounted by means of pin 20 between the frame members 18 and has a series of teeth 32 formed along a circularly arcuate edge. A pawl element 30 is supported by the two guide pins 22, 24 between the frame members 18. Each of the guide pins extends through a corresponding slot 34, 36 respectively, formed in the pawl element 30. The pawl 30 is an elongated member extending between a toothed end 38 and a handle end 42. The pawl end 38 has a series of pawl teeth formed along a circularly concave edge, shaped and sized so as to mesh with the plate teeth 32. A cutout 44 is formed in the handle end 42 of the pawl element within which are defined a pawl return edge 46, a pawl release edge 48 and an edge 52. A handle 41 which includes a cylindrical shaft 40 extends normally through the two frame members 18 and is rotatable relative to the frame 16. The handle 40 includes a cam portion 50 intermediate the two frame members 18. The release handle 40 as well as cam 50 are biased by means of spring 54 which has one end anchored to the handle at 56 and the other end secured to a plate member 18 at 57. The spring 54 applies counterclockwise torque to the cam and handle as seen in FIG. 2, biasing the cam end 58 against the pawl return edge 46 and thereby normally urging the pawl towards its locking position in meshing engagement with the plate 28. The release handle 40 is rotatable in a clockwise direction as suggested by the arrow on the cam in FIG. 2, so as to bring a portion 62 of the cam into engagement with the release edge 48. As shown in FIG. 3, manual rotational force applied to the handle 40 suggested by arrow A is thus transmitted through the cam 50 against the release edge 48, moving the pawl 30 out of meshing engagement with the plate 28 and towards its release position as indicated by arrow B, thus releasing the plate 28 for free pivotal movement about pin 20 relative to frame 16. Rotational movement of the handle can be limited either by contact of the cam against the stop edge 52 as seen in FIG. 3 or by dimensioning the slot 36 such that movement of the pawl 30 away from the locking position is limited by contact with guide pin 22, thus also stopping rotation of the handle 40 once pawl disengagement from the plate teeth 32 has been achieved.

In the usual automotive seat installation the plate 28 is strongly spring-biased (by means not shown in the drawings) towards an upright position wherein the stop pin 35 contacts the left-hand end of slot 37 so as to return the backrest to its upright position upon actuation of the release handle in the absence of any weight bearing against the backrest. If other than an upright position is desired, the driver leans against or otherwise pushes back the backrest to the desired inclination, while maintaining the release handle 40 in the release position. Upon releasing the handle at the desired backrest inclination the pawl 30 locks the plate 28 and prevents further movement of the backrest.

As best appreciated in FIGS. 2 and 3, the two slots 34, 36 in the pawl element 30 are each elongated along a line which is either radial or parallel to a line radial to the two circularly curved toothed edges on the plate 28 and pawl 30 respectively. The width of the two slots measured in a direction transverse to said radial line is only slightly greater than the diameter of the guide pins 22, 24 extending through the respective slots. The pawl 30 is substantially constrained by cooperation between the slots 34, 36 with guide pins 24, 22 to linear movement parallel to line R—R in FIG. 2. The line R—R connects the centers of the pivot 20 and handle shaft 40 and is therefore radial to the arcuate toothed edges 32 and 38. The pawl teeth therefore move into and out of meshing engagement with the plate teeth along this radial line R—R or along lines parallel thereto. The linear movement of the pawl element results in simultaneous engagement of all the pawl teeth with the plate teeth. Further, it will be appreciated that the handle 40 can be mounted at any convenient distance from the plate 28 by simply elongating or shortening the frame 16 and the pawl 30, as required. The mechanism can thus be easily adapted to different seat styles, sizes and installations, while retaining the basic configuration, advantageous operating features and simplicity of this novel mechanism.

The range of backrest angular adjustment is limited by a stop-pin 35 affixed between the two frame members 18 and extending through an arcuate slot 37 in plate 28.

In FIG. 2, a recliner locking mechanism 12 is shown in relation to a typical reclining seat suggested in dotted lining. The seat includes a fixed seat portion 200 and a reclinable backrest 202 which is pivotably mounted to the seat 200 and movable through a range of angular positions between a fully erect and a fully reclined backrest position. The frame 16 of the locking mechanism is mounted to the fixed seat portion 200 by any suitable means, typically by bolting to the seat frame, while the plate 28 is similarly attached to the backrest 202. The mechanism 12 in FIG. 2 is similar to that of FIG. 1 except that the inertia lock mechanism 14 is absent and the plate 28 is extended upwardly by portion 28a to a height suitable for attachment to the backrest 202. The mechanism of FIG. 2 would typically find application in a 4-door automobile where the forward seats do not have forwardly tiltable backrests.

In FIG. 3, an integrated unit 10 similar to that of FIG. 1 is shown including both the recliner adjustment mechanism 12 as well as the inertia operated lock 14. The structure and operation of the recliner adjustment mechanism 12 is similar in either FIG. 2 or 3.

Figure 5:
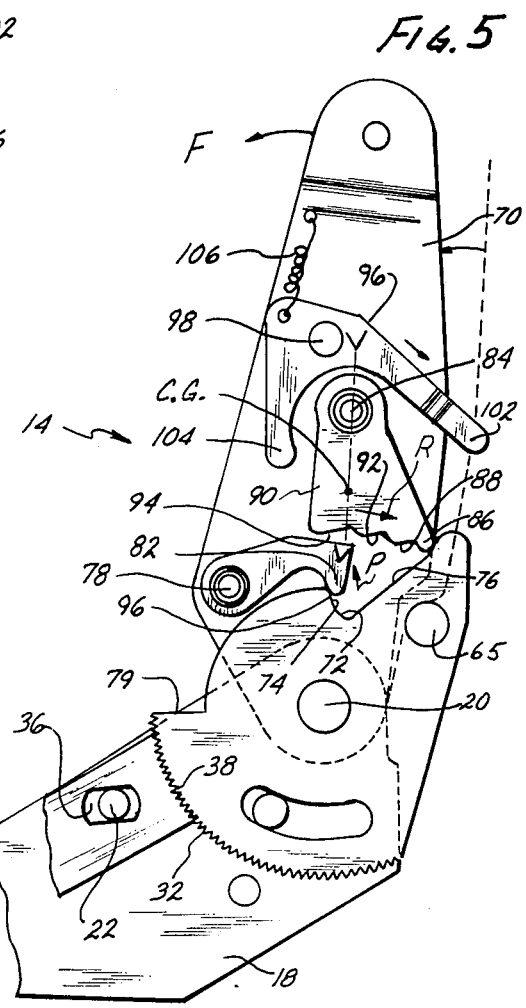
FIG. 5 illustrates operation of the inertia lock allowing free normal forward pivoting of the upper plate attached to the backrest.

The inertia operated backrest locking mechanism 14 includes a lower plate which in the illustrated embodiment of the invention is plate 28, earlier referred to as the upper plate in connection with the description of the recliner adjustment mechanism 12. The entire mechanism 12 including the frame 16 and plate 28 may be considered to be the lower, fixed portion of the inertia lock 14 for purposes of the following explanation. An upper plate 70 is pivotably connected to the lower plate 28 by means of pivot pin 20 which also pivotably interconnects the plate 28 to the two frame members 18. With the recliner adjustment mechanism 12 in locked condition, the plate 28 is fixed relative to the frame 16 while plate 70 remains pivotable about pin 20 relative to both the pate 28 and frame 16. The backrest of the seat is affixed to the upper plate 70 instead of plate 28 and is supported in its normal upright condition against rearward pivotal movement by a backstop pin 65 affixed to plate 28. The upper edge of the plate 28 defines a notch recess 72, a first cam edge 74 and a second cam edge 76. A pawl element 80 is pivoted at 78 to the upper plate 70 and has a hooked end 82 which normally rests within and engages the recess 72 as seen in FIGS. 1 and 3. A pendulum 90 is suspended at pivot 84 to the upper plate 70. In a normal rest position, shown in FIGS. 1 and 3, the lower end 86 of the pendulum rests against the cam surface 76 through the full range of backrest positions relative to the frame 16 obtainable by means of the recliner mechanism 12. The pendulum 90 constitutes an inertial mass having a center of gravity indicated as C.G. The cam edge 76 supports the pendulum 90 in a biased position towards the pawl 80. In this biased position the pendulum's center of gravity is raised above what would be the normal rest position of the pendulum, i.e., a rest position wherein the center of gravity lies along a vertical line with the pendulum pivot 84, such that in the biased position the center of gravity lies forwardly (towards the left in the drawings) of such a vertical line V—V drawn through the pivot 84. The pendulum mass 90 thus tends to fall towards its natural rest position but is prevented from doing so by the cam edge 76. The lower edge of the pendulum 90 is stepped to define a lower camming end 86 which rests against the cam edge 76, a first stop edge 88, a second stop edge 92 and a recess 94 arranged in this order from the rear towards the front of the pendulum. In a non-accelerated condition of the mechanism 10, the upper plate 70 is freely pivotable in a forward direction indicated by arrow F in FIG. 3 relative to the plate 28. As shown in FIG. 5, when the plate 70 is pivoted forward relative to the plate 28 the pawl 80 moves forwardly together with the plate 70 and the end 82 of the pawl rides up along the first cam edge 74 out of engagement with the recess 72. Simultaneously, the pivot point 84 of pendulum 90 also moves forwardly away from the second cam edge 76 allowing the pendulum 90 to swing downwardly towards its normal rest position until its center of gravity (C.G.) is in underlying vertical alignment with the pivot 84 along line V—V. In this condition of the pendulum the pendulum recess 94 overlies the end 82 of the pawl 80 and allows the pawl 80 to rise over the high point 96 of the cam edge 74 so as to withdraw fully out of engagement with recess 72, thus allowing the upper plate 70 and the backrest attached thereto to be tilted or "dumped" forwardly relative to the stationary frame 16. Forward pivotal movement of the upper plate 70 is limited by abutment of the pawl pivot pin 78 against stop edge 79 on plate 28.

Figure 7:
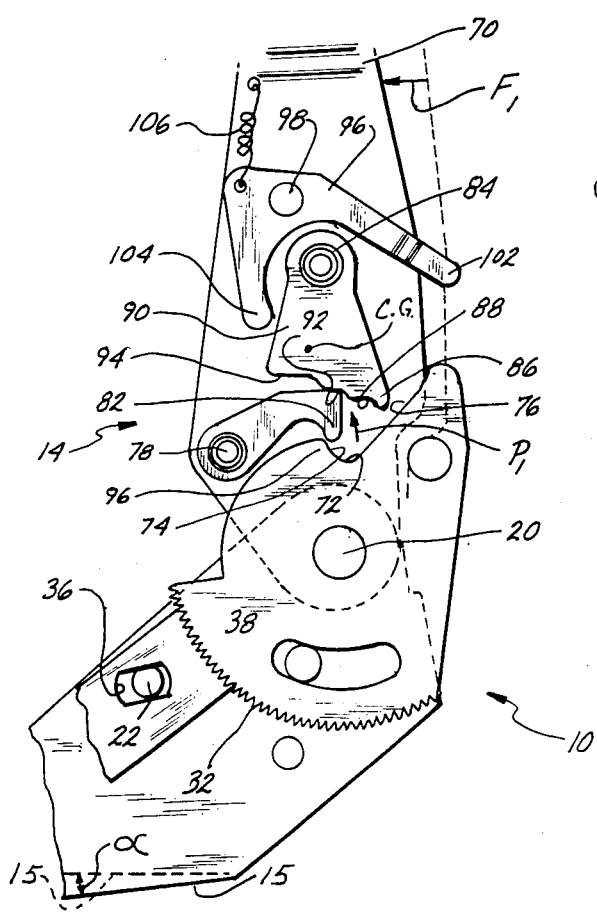
FIG. 7 illustrates locking of the backrest by the inertia locking mechanism while the device is tilted forwardly as it would be during downhill travel.

Normal release of the plate 70 for forward pivotal movement away from backstop pin 65 thus requires simultaneous movement of the pendulum 90 away from the pawl 80 as indicated by the arrow R in FIG. 5 and upward pivotal movement of the pawl 80 indicated by arrow P to bring the pawl end 82 out of engagement with recess 72. If the pendulum 90 fails to swing away from the pawl 80 as the pendulum moves away from the supporting cam surface 76 during forward tilting of the plate 70, the second stop edge 92 remains in overlying relationship with the pawl end 82 and will stop the pawl end from withdrawing and disengaging from the recess 72 after a limited pivotal movement of both the plate 70 and pawl 80. This is a safety feature provided in the event that the pendulum 90 freezes in its biased position due to accumulation of dirt or any other reason, thus to ensure locking of the backrest against its inertia during deceleration of the vehicle. Similarly, if the entire locking device 10 is tilted forwardly by a sufficient angle alpha from its normal position in which the lower edge 15 of frame 16 is substantially horizontal, the center of gravity C.G. of pendulum 90 will be brought into near or actual vertical alignment with pendulum pivot 84 as illustrated in FIG. 7. In this condition the pendulum swing forwardly away from the second cam surface 76 and hangs with the second stop edge 92 in overlying relationship with the pawl end 82. Such a condition may occur, for example, while the vehicle in which the seat mechanism 10 is installed is either parked on or travelling down a steep grade. At such times it is desirable to lock the backrest against forward pivoting to prevent it from falling forwardly against a driver due to the vehicle's inclination. Towards this end the second stop edge 92 prevents the pawl end 82 from clearing the high point 96 of the first cam edge 74 and keeps the pawl end from withdrawing from the recess 72 in plate 28 and thus locks the upper plate 70 following limited forward pivotal movement as suggested in FIG. 7 by the arrow F1. The pawl rises a short distance out of the recess 72 as indicated by arrow P1 but cannot clear the top 96 of the cam edge 74 before coming into contact with the stop edge 92.

In either of these two situations, namely freezing of the pivot in the biased position or forward overall tilting of the mechanism 10, release of the upper plate 70 can be manually achieved by means of a manual release lever 96 which is pivoted to the upper plate 70 at 98. By manually raising the outer end 102 of the lever, the inner end 104 of the release lever can be brought to bear against the forward edge of the pendulum 90, pushing the pendulum toward its release position against the second cam surface 76 and away from engagement with the pawl 80. The lever 96 is biased by a spring 106 to a normal position with its inner end 104 spaced from the leading edge of the pendulum 90.

Figure 6:
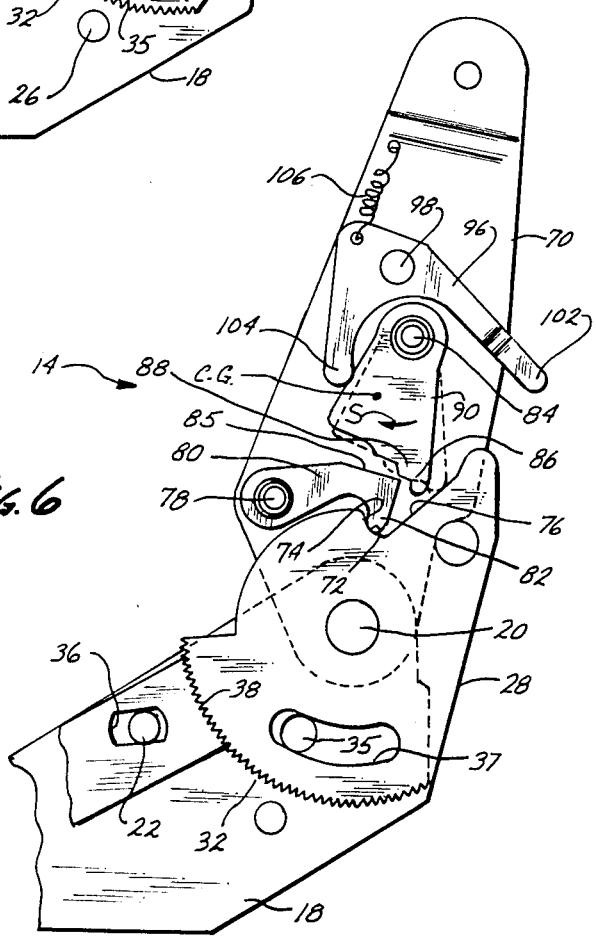
FIG. 6 shows the pendulum being carried by inertia into locking position.
Figure 4:
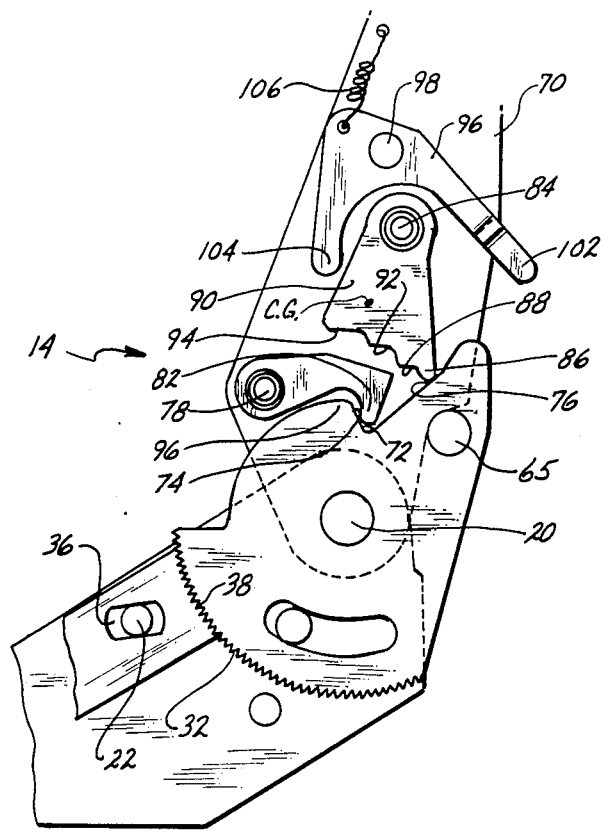
FIG. 4 is a fragmentary view of the mechanism of FIG. 3 showing the inertia operated lock in a normal condition with the backrest in an upright position.

Inertia-induced locking of the lock mechanism 14 is illustrated in FIG. 6 with the upper plate 70 in a normal upright position and the pendulum 90 resting against camming edge 76 in its normal biased state as the initial conditions. Upon deceleration of the entire mechanism, the pendulum inertial mass swings forwardly as indicated by the arrow S in FIG. 6 from its normal biased condition shown in dotted lining to its locking position shown in solid line. In the locking position the first stop edge 88 of the pendulum 90 engages the upper edge 85 of the pawl 80 and positively stops the pawl against disengagement from the recess 72 prior to any substantial movement of the backrest secured to upper plate 70. Because of the pre-biased condition of the pendulum which is supported with its stop edge 88 in near proximity to the upper edge 84 of the pawl 80, the distance to be traveled by the pendulum to obtain positive locking of the pawl and thus of the plate 70 is small. Due to the pendulum's relatively small mass compared to the combined mass of the plate 70 and the backrest to which it is normally attached, the pendulum covers this short distance very quickly and before any appreciable forward pivoting of the upper plate 70 and backrest can take place due to much greater inertia of the latter. The response of this lock mechanism to inertial force is thus quick and positive. Should the pendulum 90 freeze in locking engagement against the pawl 80 after inertial forces are no longer operating on the mechanism, the pendulum can be manually returned to its normal biased position by operation of the lever 96 in the manner earlier described.

It will be self-evident that the inertia lock 14 can be installed in a vehicle seat apart from the recliner mechanism 12, in which case the lower plate 28 is secured directly to a stationary seat portion.

While preferred embodiments of the invention have been described and illustrated for purposes of clarity, still other changes, modifications and substitutions to the described embodiments will become apparent to those possessed of ordinary skill in the art. The scope of the invention is therefore not delimited by the foregoing description but is defined only by the following claims.

What is claimed is:

1. An inertia operated lock for a forward tilting backrest in a vehicle seat comprising:
   a lower plate attachable to the seat;
   an upper plate pivoted to said lower plate and attachable to the backrest;
   a pawl pivoted to the upper plate and normally engaging a recess in said lower plate;
   first cam means on said lower plate urging said pawl out of engagement with said recess in response to forward pivoting motion of said upper plate;
   a pendulum pivotably suspended to said upper plate, said pendulum being swingable by its forward inertia, upon simultaneous deceleration of both said upper and lower plates, into engagement with said pawl to positively stop the pawl against disengagement from said lower plate thereby interlocking said upper and lower plates against pivotal movement; and in second cam means;
   on said lower plate normally biasing the pendulum towards engagement with said pawl, said second cam means releasing the pendulum away from engagement with the pawl upon forward pivotal movement of the upper plate thereby normally allowing free forward pivoting of the upper plate in relation to the lower plate.

2. The device of claim 1 further comprising stop means limiting rearward pivoting of the upper plate at an upright backrest position relative to the lower plate and wherein the center of gravity of said pendulum is located such that the pendulum does not move away from engagement with said pawl upon attempted forward pivoting of the upper plate from said upright backrest position in the event of the entire mechanism being forwardly tilted beyond a predetermined angle to a normal device position to thereby prevent accidental forward dumping of the backrest during pronounced forward tilting of the vehicle seat.

3. The device of claim 1 or 2 wherein said pendulum includes a means for stopping said pawl against disengagement from said lower plate upon attempted forward pivoting of said upper plate while said pendulum is in said biased position so as to ensure backrest locking in the event the pendulum becomes non-responsive to inertial force.

4. The device of claim 1 or 2 further comprising release means manually operable for moving said pendulum out of engagement with said pawl to thereby allow free forward pivoting of the upper plate relative to the lower plate.

5. The device of claim 3 further comprising release means manually operable for moving said pendulum out of engagement with said pawl to thereby allow free forward pivoting of the upper plate relative to the lower plate.

6. An inertia operated lock for a forward tilting backrest in a vehicle seat comprising:

a lower plate attachable to the seat;

an upper plate attachable to the backrest and pivoted to said lower plate;

a pawl pivoted to the upper plate and normally engaging a recess in said lower plate;

first cam means on said lower plate for urging said pawl out of engagement with said recess in response to forward pivoting motion of said upper plate;

a pendulum pivotably suspended to said upper plate;

means on said lower plate normally supporting said pendulum in a biased position with its center of gravity raised forwardly of its rest position towards engagement with said pawl;

first stop means on said pendulum arranged so as to stop said pawl against disengagement from said lower plate following limited pivotal movement of said upper plate while said pendulum remains in said biased position;

second stop means on said pendulum engageable with said pawl upon forward inertial swinging of the pendulum due to deceleration of both said upper and lower plates to stop the pawl against disengagement from said lower plate thereby to positively interlock said upper and lower plates against any substantial pivotal movement; and second cam means on said lower plate releasing the pendulum towards its rest position away from engagement with the pawl upon forward pivotal motion of the upper plate thereby normally allowing free forward pivoting of the upper plate in relation to the lower plate.

* * * * *